(12) United States Patent
Hong et al.

(10) Patent No.: US 7,099,632 B2
(45) Date of Patent: Aug. 29, 2006

(54) WIRELESS PHONE HAVING IMPROVED SAR

(75) Inventors: Choong-Sheek Hong, Jeil-Insurance Building 9th floor, 267-3 Seohyun-dong, Bundang-gu, Sungnam-si, Kyounggi-do (KR); Yong-Joo Byun, Sungnam-si (KR)

(73) Assignee: Choong-Sheek Hong, Kyounggi-Do (KR)

( * ) Notice: Subject to any disclaimer, the term of this patent is extended or adjusted under 35 U.S.C. 154(b) by 476 days.

(21) Appl. No.: 10/338,904

(22) Filed: Jan. 9, 2003

(65) Prior Publication Data

US 2004/0203529 A1   Oct. 14, 2004

(30) Foreign Application Priority Data

Aug. 30, 2002   (KR) .................... 10-2002-0051743

(51) Int. Cl.
*H04B 1/38* (2006.01)
*H04Q 11/12* (2006.01)
*H04M 1/00* (2006.01)

(52) U.S. Cl. ............... 455/90.3; 455/117; 455/575.5; 343/702

(58) Field of Classification Search ............ 455/575.5, 455/117, 128, 129, 90.3; 343/702, 841; 379/437, 379/447
See application file for complete search history.

(56) References Cited

U.S. PATENT DOCUMENTS

| 5,336,896 | A | * | 8/1994 | Katz ..................... 250/515.1 |
| 5,367,309 | A | * | 11/1994 | Tashjian ..................... 343/702 |
| 5,444,866 | A | * | 8/1995 | Cykiert ..................... 455/575.5 |
| 5,564,085 | A | * | 10/1996 | Chen et al. ................. 455/117 |
| 5,657,386 | A | * | 8/1997 | Schwanke ................ 379/433.13 |
| 6,215,447 | B1 | * | 4/2001 | Johnson ..................... 343/702 |
| 6,894,649 | B1 | * | 5/2005 | Östervall ..................... 343/702 |
| 2003/0045246 | A1 | * | 3/2003 | Lee et al. ..................... 455/90 |
| 2004/0023682 | A1 | * | 2/2004 | Lee et al. ................ 455/550.1 |
| 2004/0046701 | A1 | * | 3/2004 | Huber et al. ................ 343/702 |
| 2004/0253972 | A1 | * | 12/2004 | Iwai et al. ............... 455/550.1 |

* cited by examiner

*Primary Examiner*—Tilahun Gesesse
(74) *Attorney, Agent, or Firm*—Andrew M Calderon; Greenblum & Bernstein PLC

(57) ABSTRACT

A wireless phone having an improved SAR includes: a lower plate having a main board; an upper plate having an LCD panel; a hinge provided to open and close the lower plate and the upper plate, the main board and the LCD panel being connected to each other by a flexible PCB; and an antenna feed point formed in the first circuit board. Particularly, ground planes are provided in the main board and the LCD panel and are connected to each other by at least two connection terminals. One of the connection terminals is provided to have a ground contact of the first circuit board within the range of 2 cm away from the antenna feed point. The connection terminal having the ground contact is provided using a central shaft of the hinge or a separator conductor.

17 Claims, 9 Drawing Sheets

PRIOR ART

PRIOR ART ground contact of position No. 1
SAR : 2.50mW/g ground contact of position
Nos. 1, 2, 3
SAR : 1.01mW/g ground contact of position
Nos. 1, 2, 3, 4, 5, 6
SAR : 0.61mW/g

WIRELESS PHONE HAVING IMPROVED SAR

BACKGROUND OF THE INVENTION

1. Field of the Invention

The present invention relates to a wireless phone having an improved specific absorption rate (SAR).

2. Discussion of the Related Art

Examples of a wireless phone include cellular phones with the frequency band of 824–849 MHz and KPCS (Korea personal communication service) phones with the frequency band of 1750–1780 MHz and USPCS (US personal communication service) phones with the frequency band of 1850–1910 MHz based on the transmitting frequency.

The wireless phone that transmits and receives data based on the above frequency bands has problems in that its electromagnetic waves with high frequencies may be harmful to a human body as it is closely touched with an ear of a user.

Considering the harmful electromagnetic waves, many countries including Korea and USA have restricted SAR values to the brain of the human body within the range of 1.6 mW/g or below. In this respect, studies of a wireless phone having an improved SAR have actively advanced.

One example of a related art wireless phone will be described with reference to FIGS. 1 and 2.

Generally, a related art wireless phone includes a lower plate 120, an upper plate 130, and a hinge 103. The lower plate 120 and the upper plate 130 are opened and closed by the hinge 103. The lower plate 120 includes a lower frame case 108, a main board 106, and a battery 102. The main board 106 is built between the lower frame case 108 and a lower frame 104. The lower frame 104 is provided with an antenna that extends upwardly. The antenna is connected with the main board 106.

Meanwhile, the upper plate 130 includes a liquid crystal display (LCD) panel 109 provided between an upper frame case 113 and an upper frame 101. Since the LCD panel 109 and the main board 106 can be folded, a flexible printed circuit board (FPCB) 110 is interposed between them so as to connect them with each other. If the FPCB is connected with the LCD panel 109 by the hinge 103, some problems may occur. That is, a portion of the hinge 103 may become thick and fatigue ratio of the FPCB may increase. Therefore, it is general that the FPCB is connected with the LCD panel 109 by bypassing the hinge 103.

The aforementioned related art wireless phone should be grounded appropriately to remove electromagnetic wave noise caused by inductive electromotive force of the main board and the LCD panel. To this end, the board that constructs a circuit may be used as a ground plane, or a separate ground sheet may be provided. The LCD panel 109 is grounded using a connection terminal formed in the FPCB 10.

As aforementioned, if the wireless phone has a folder type, the FPCB 110 is provided far away from the hinge 103. The antenna 105 is provided on the outer edge of the hinge 103 so as to reduce the effect of the electromagnetic wave noise.

The current distribution of the related art wireless phone will be described with reference to FIG. 2.

The current distribution of the related art wireless phone shown in FIG. 2 was measured using an SAR measurement system which is a Swiss make Dosimetric Assessment System (Model No.: DASY3). In FIG. 2, it is noted that a hot spot on which strong electric field is concentrated exists within the lower plate 120 in which the antenna 105 is positioned. Slant lines in FIG. 2 belong to the hot spot.

As will be apparent from the expression, $SAR = \sigma \cdot E^2 / \rho$ ($\sigma$: conductive rate (s/m), E: electric field strength, $\rho$: tissue density (kg/m$^2$), the SAR value is proportional to the electric field strength. Therefore, the greater the electric field strength is, the greater the SAR value is and the more harmful to the human body it is. For these reasons, the user is likely to be exposed to the strong electromagnetic wave in case of using the related art wireless phone.

SUMMARY OF THE INVENTION

The present invention is directed to a wireless phone having an improved SAR that substantially obviates one or more of the problems due to limitations and disadvantages of the related art.

An object of the present invention is to provide a wireless phone having an improved SAR that allows a user to be less exposed to the electromagnetic wave by moving a hot spot having a great SAR value to an outer side of the wireless phone.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a wireless phone having an improved SAR according to the present invention includes at least two ground connection terminals that connect a main board of a lower plate with an LCD panel of an upper plate, wherein one of the ground connection terminals is formed within the range of 2 cm away from an antenna feed point.

One of the ground connection terminals connects the main board with the LCD panel using the existing FPCB while the other ground connection terminal performs its connection function using a hinge.

The hinge having the connection terminal function that connects the main board with a ground plane of the LCD panel is provided in such a manner that a driving central shaft formed therein conducts the main board to the ground plane of the LCD panel.

To further achieve these and other advantages and in accordance with the purpose of the present invention, a wireless phone having an improved SAR according to the present invention includes: a lower plate having a first circuit board; an upper plate having a second circuit board; a hinge provided to open and close the lower plate and the upper plate; an antenna feed point formed in the first circuit board; and ground planes provided in the first circuit board and the second circuit board and connected to each other by at least two connection terminals, one of the connection terminals being provided to have a ground contact of the first circuit board within the range of 2 cm away from the antenna feed point.

The first circuit board and the second circuit board are connected to each other by a flexible PCB.

One of the connection terminals is provided in the FPCB, and the connection terminal provided in the FPCB includes a ground contact.

The ground contact of the connection terminal formed in the FPCB is provided in the first circuit board or the second circuit board.

The connection terminal having the ground contact formed within the range of 2 cm away from the antenna feed point is provided using the hinge or a separator conductor.

The antenna feed point is formed within the range of 2 cm away from the FPCB.

The FPCB is provided to bypass the hinge.

The connection terminal is provided using a central shaft formed in the hinge.

It is to be understood that both the foregoing general description and the following detailed description are exemplary and explanatory and are intended to provide further explanation of the invention as claimed.

BRIEF DESCRIPTION OF THE ATTACHED DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

A wireless phone having an improved SAR according to the present invention will be described with reference to FIGS. 3 to 8.

Figure 1:
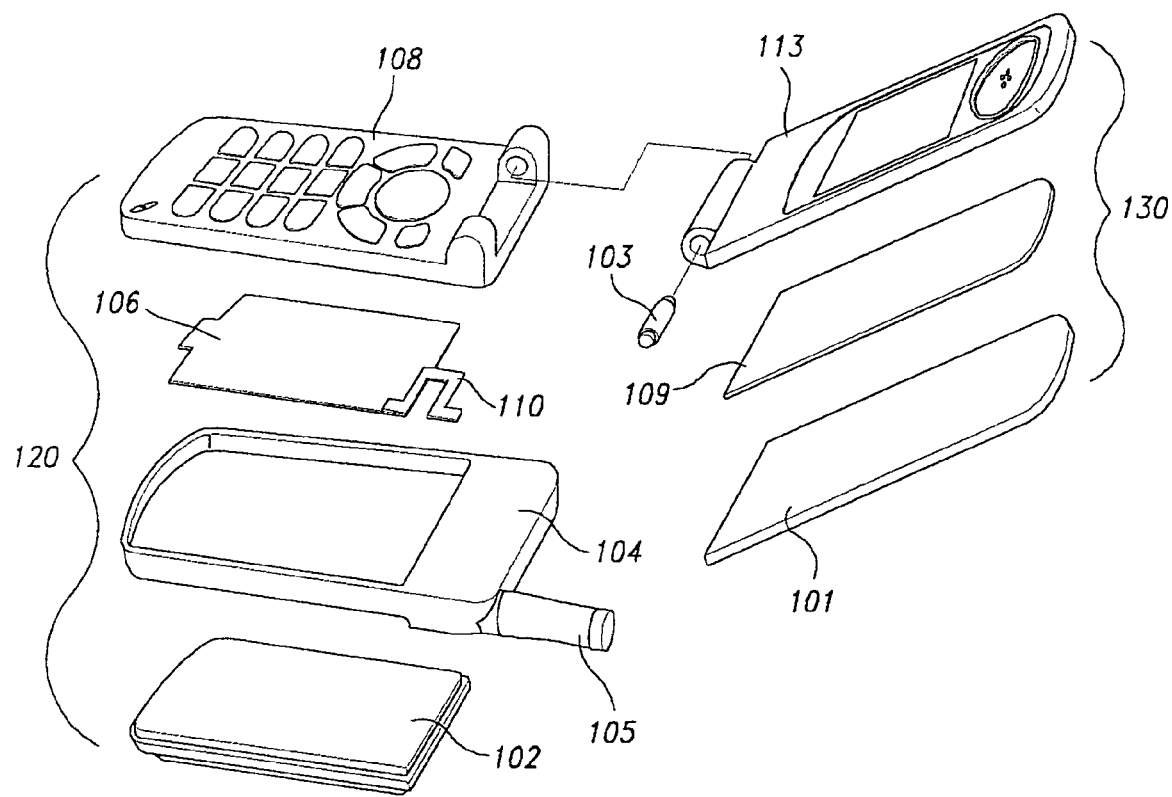
FIG. 1 illustrates a structure of a related art folder type wireless phone.
Figure 2:
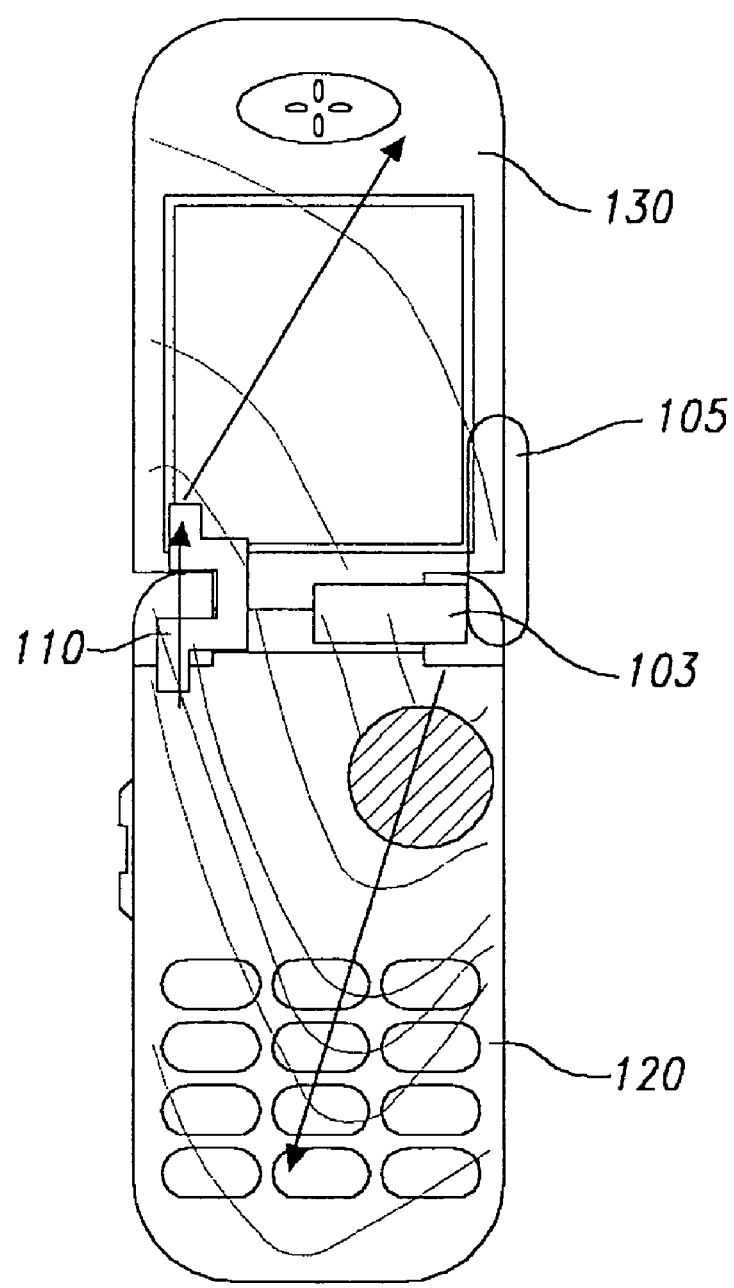
FIG. 2 illustrates the distribution of SAR of a related art folder type wireless phone.
Figure 3:
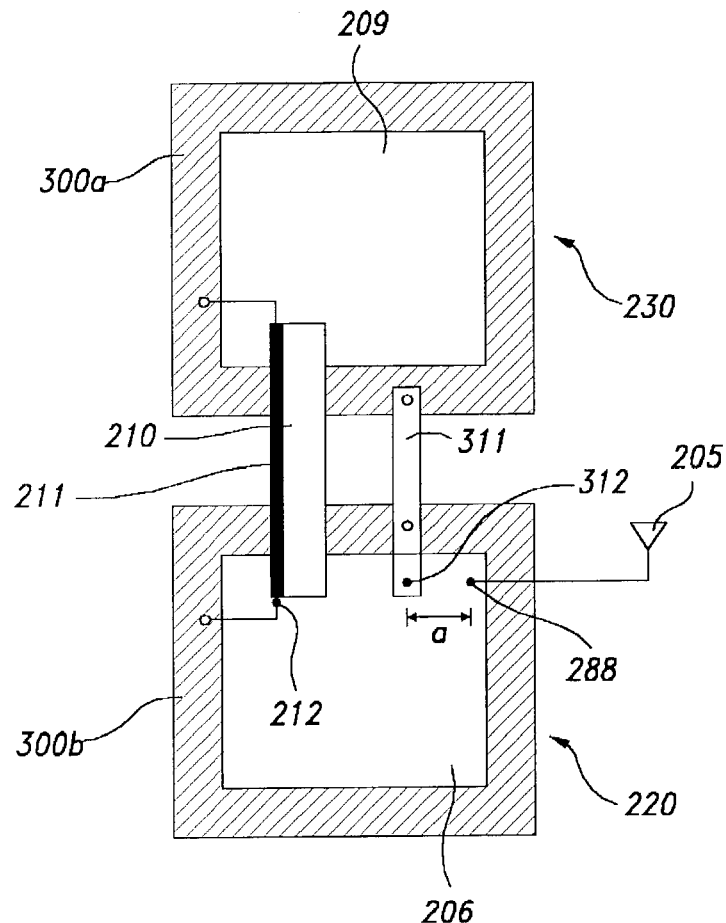
FIG. 3 illustrates a ground structure of a folder type wireless phone according to the present invention.

A folder type wireless phone according to the present invention, as shown in FIG. 3, includes an upper plate 230 and a lower plate 220. The upper plate 230 includes an LCD panel 209 constituting a second circuit board, and a ground plane 300a. The lower plate 220 includes a main board 206 constituting a first circuit board, and a ground plane 300b.

The upper plate and the lower plate are provided in such a manner that the LCD panel is connected with the main board by a FPCB 210 and ground planes 300a and 300b are conducted to each other by a connection terminal 211 of a ground plane provided in the FPCB. The connection terminal 211 of the ground plane has a ground contact 212 that grounds the main board 206 and the LCD panel 209. In the structure of FIG. 3, the ground contact of the connection terminal 211 is shown only in the main board 206. However, the ground contact may be provided in the LCD panel 209 or both the LCD panel and the main board.

Furthermore, the main board 206 is provided with an antenna feed point 288 that connects the antenna 205 with a circuit of the main board.

Particularly, in addition to the connection terminal 211 of the ground plane provided in the FPCB, a separate connection terminal 311 of the ground plane is provided near the antenna feed point 288. The connection terminal 311 has a ground contact 312 that grounds the main board 206. The ground contact provided in the connection terminal 311 is positioned within the distance 'a' of 2 cm away from the antenna feed point 288.

Figure 4:
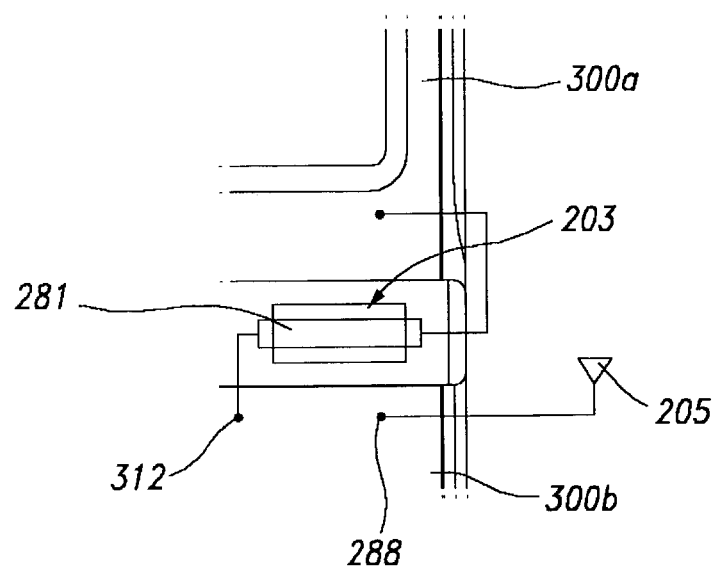
FIG. 4 illustrates a structure in which a hinge of a folder type wireless phone according to the present invention that conducts a ground plane provided in an upper plate and a lower plate.

In the structure of FIG. 3, while the connection terminal 311 of the ground plane positioned toward the antenna has been exemplarily illustrated, the existing hinge may function as the connection terminal. FIG. 4 illustrates a structure in which the hinge has a function of the connection terminal 311 of FIG. 3. Referring to FIG. 4, the ground plane 300a provided in the upper plate can simply be conducted to the ground plane 300b provided in the lower plate using a central shaft 281 of the hinge 203.

As described above, in the present invention, a plurality of ground contacts that ground the LCD panel and the main board are provided in the ground planes 300a and 300b. One of the ground contacts is provided within the distance 'a' of 2 cm (preferably, 1 cm to 0.5 cm) away from the antenna feed point so as to reduce the SAR value of the wireless phone to the large extent.

Embodiment

Figure 5:
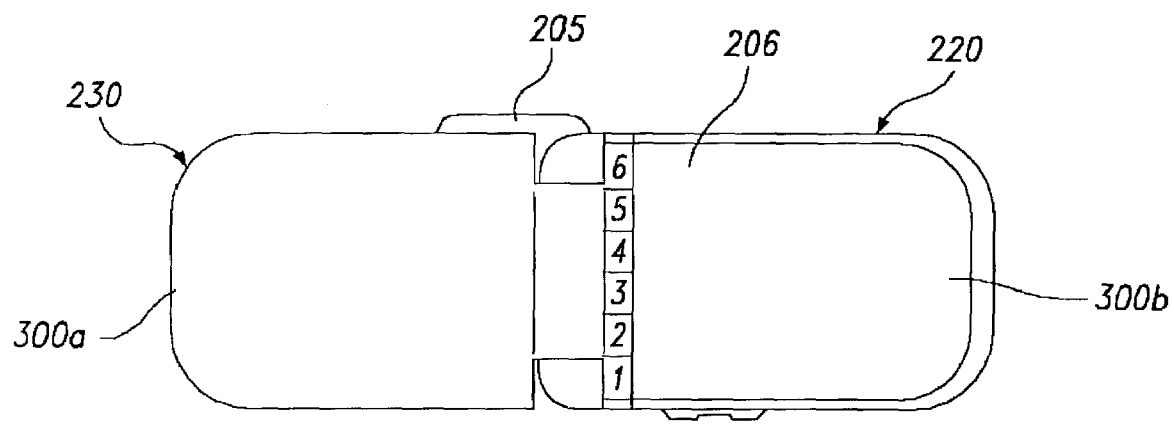
FIG. 5 illustrates a position change of a hot spot of SAR depending on the number and position of contacts of a folder type wireless phone according to the present invention.

As shown in FIG. 5, the ground plane 300a provided in the upper plate 230 and the ground plane 300b provided in the lower plate are connected with each other, and then six ground contacts 1,2,3,4,5,6 grounded in the main board 206 formed in the ground plane of the lower plate are set at constant intervals.

Subsequently, the ground contacts are divided into several cases as follows; all ground contacts are not grounded, the first ground contact is only grounded in the same manner as the related art, the first and second ground contacts are only grounded, the first, second and third ground contacts are only grounded, the first, second, third and fourth ground contacts are only grounded, the first, second, third, fourth and fifth ground contacts are only grounded, the first, second, third, fourth, fifth and sixth ground contacts are all grounded, the sixth ground contact is only grounded, and the first and sixth ground contacts are only grounded. As a result, output, sensitivity, and SAR of the wireless phone can be measured in the frequency band of 824.64 MHz, which is the lowest frequency among 20 channels used in the cellular phone.

Swiss make Dosimetric Assessment system (Model No.: DASY 3) has been used to measure the SAR. CDMA mobile test set (Model: E8285A) by Hewlett Packard Company has been used to measure receive sensitivity of the frequency.

The measurement results, as shown in Table 1, indicate that the greatest SAR value is obtained when no ground contact is provided or the first ground contact is only grounded while smaller SAR values are obtained as the ground contact moves to the antenna feed point 288 and more ground contacts are provided. Especially, it is noted that there is no difference in the receive sensitivity of the frequency even if the SAR value is reduced.

TABLE 1

| | Frequency (824.64 MHz) | | | | | | |
|---|---|---|---|---|---|---|---|
| | Output (dBm) | | | Receive sensitivity (dBm) | | | |
| Ground contacts | Vertical polarized wave | Horizontal polarized wave | Average | Vertical polarized wave | Horizontal polarized wave | Average | SAR value (mW/g) |
| 0 | 23.4 | 5.1 | 14.25 | −101 | −85 | −93 | 2.70 |
| 1 | 19.4 | 7.2 | 13.3 | −101 | −87 | −94 | 2.50 |
| 1, 2 | 13.7 | 12.2 | 12.95 | −94 | −91 | −92.5 | 1.72 |
| 1, 2, 3 | 8.9 | 17.3 | 13.1 | −89 | −95 | −92 | 1.01 |
| 1, 2, 3, 4 | 7.4 | 20 | 13.7 | −87 | −97 | −92 | 0.82 |
| 1, 2, 3, 4, 5 | 4.8 | 23.1 | 13.95 | −84 | −100 | −92 | 0.79 |
| 1, 2, 3, 4, 5, 6 | 5.0 | 23 | 14 | −83 | −100 | −91.5 | 0.61 |
| 6 | 18.7 | 10.4 | 14.55 | −101 | −90 | −95.5 | 0.78 |
| 1, 6 | 9.8 | 18.3 | 14.05 | −90 | −97 | −93.5 | 0.60 |

Figure 6:
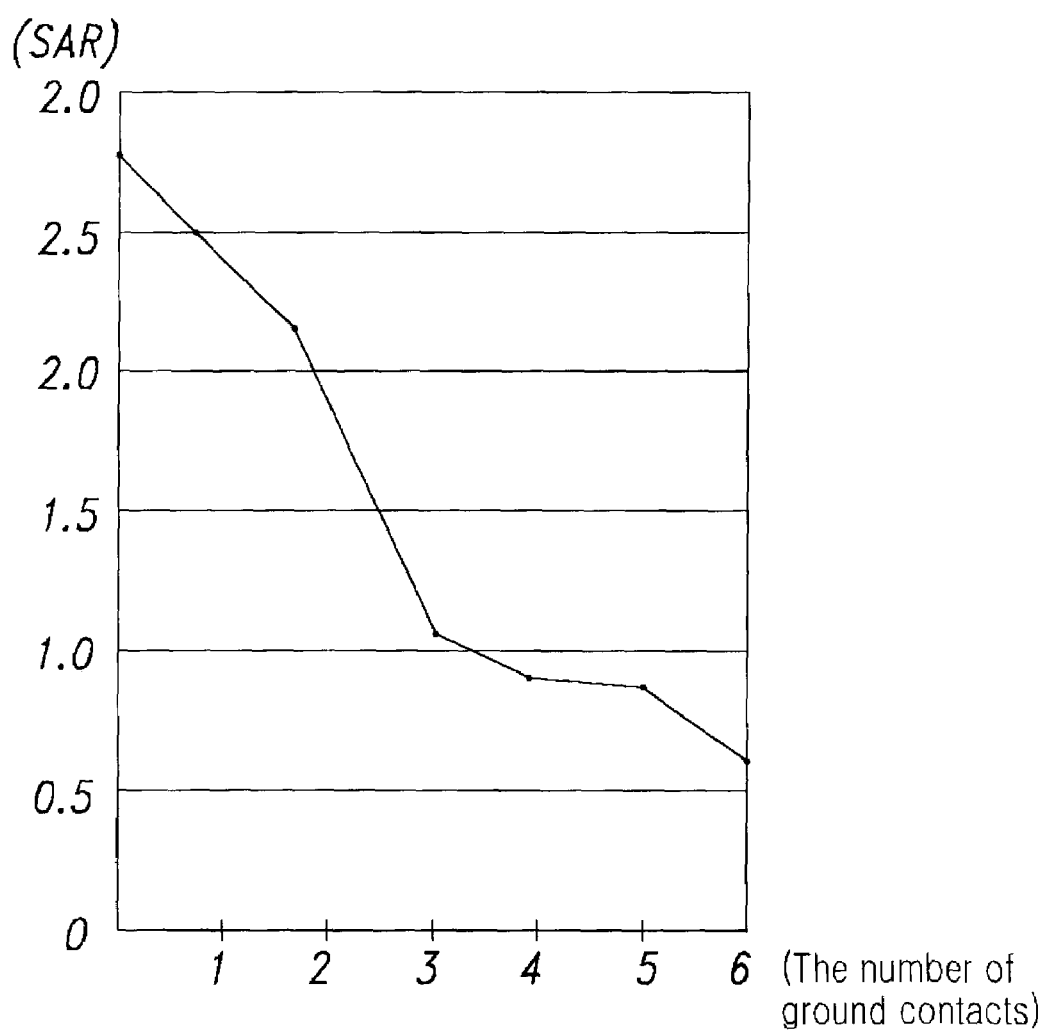
FIG. 6 illustrates a change of SAR value depending on the number of ground contacts of a ground plane in a folder type wireless phone according to the present invention.

FIG. 6 is a graph illustrating data of Table 1, in which the SAR value is reduced as ground contacts are added to the position of the antenna feed point.

Figure 7A:
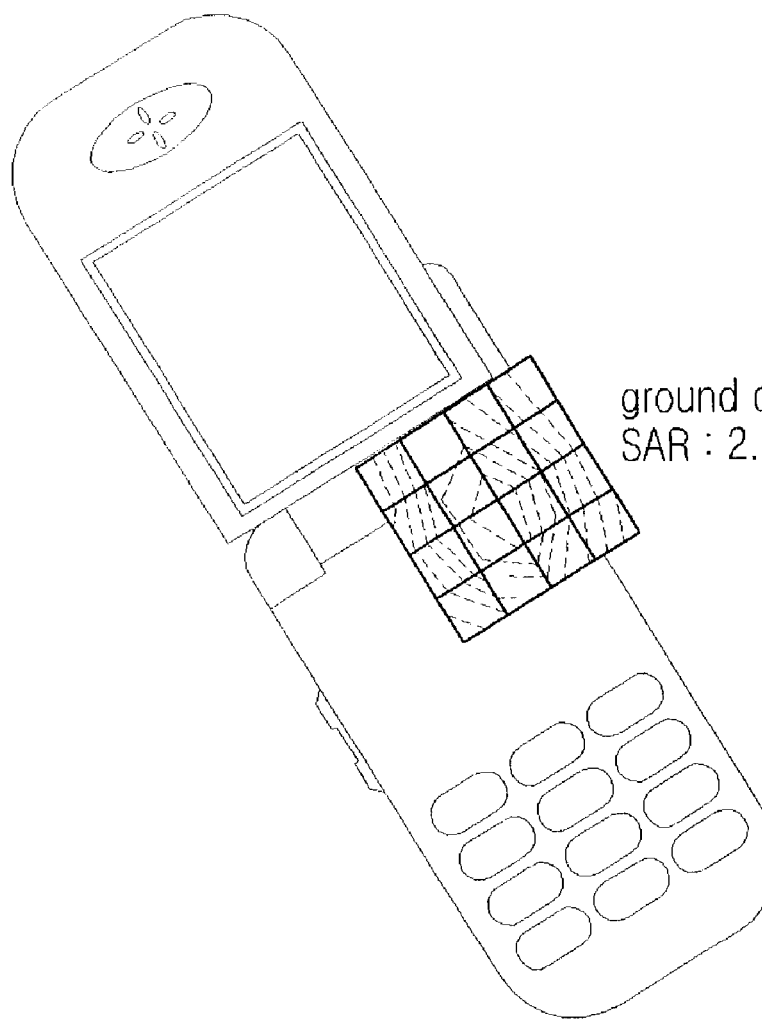
FIGS. 7a to 7d illustrate position changes of a hot spot depending on the number of ground contacts of a ground plane in a folder type wireless phone according to the present invention.
Figure 7B:
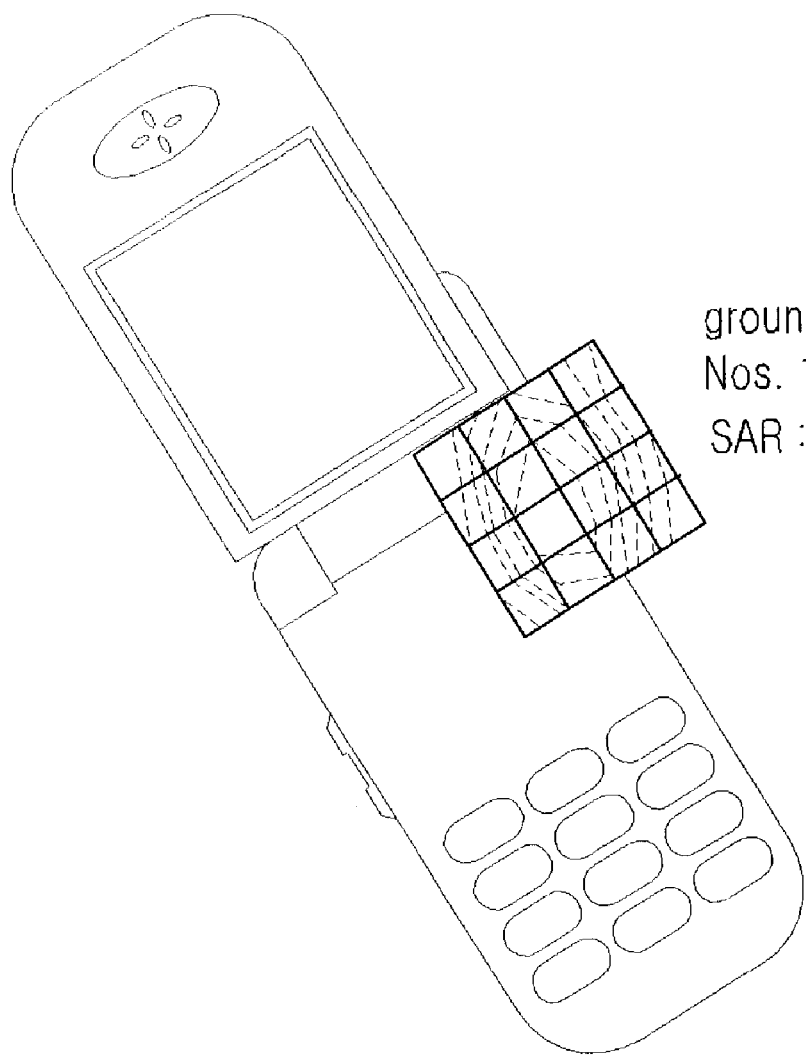
Figure 7C:
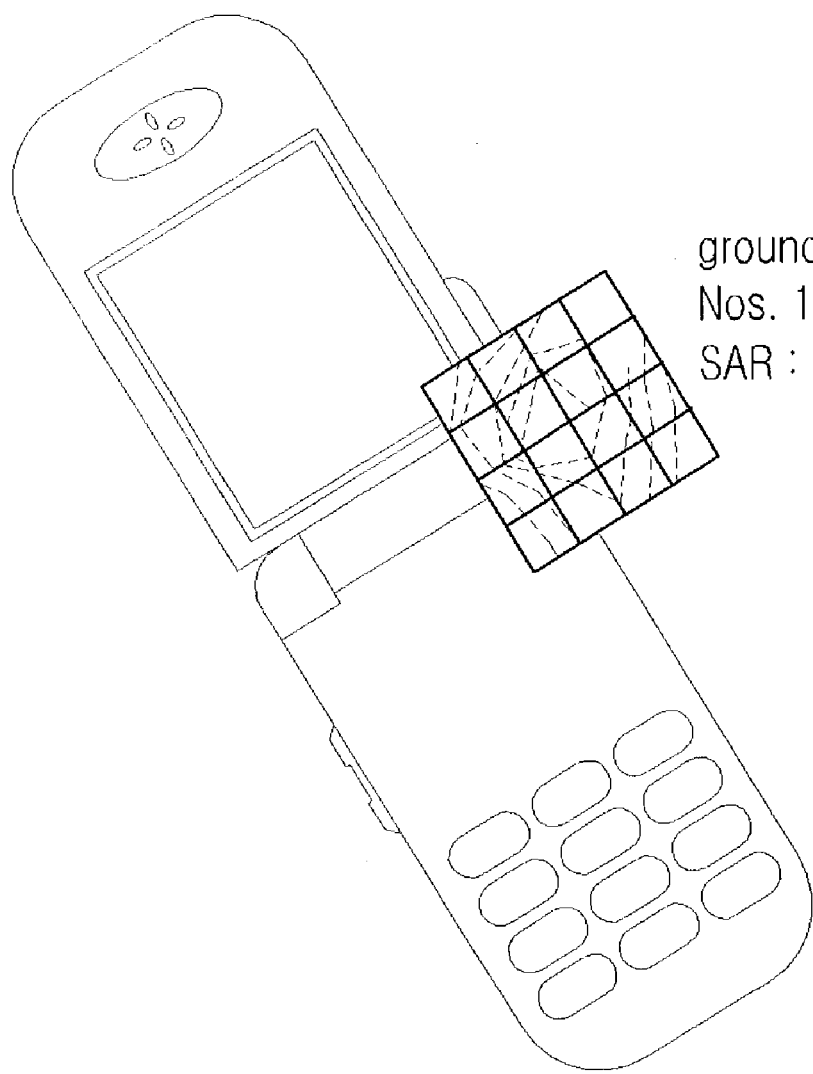
Figure 7D:
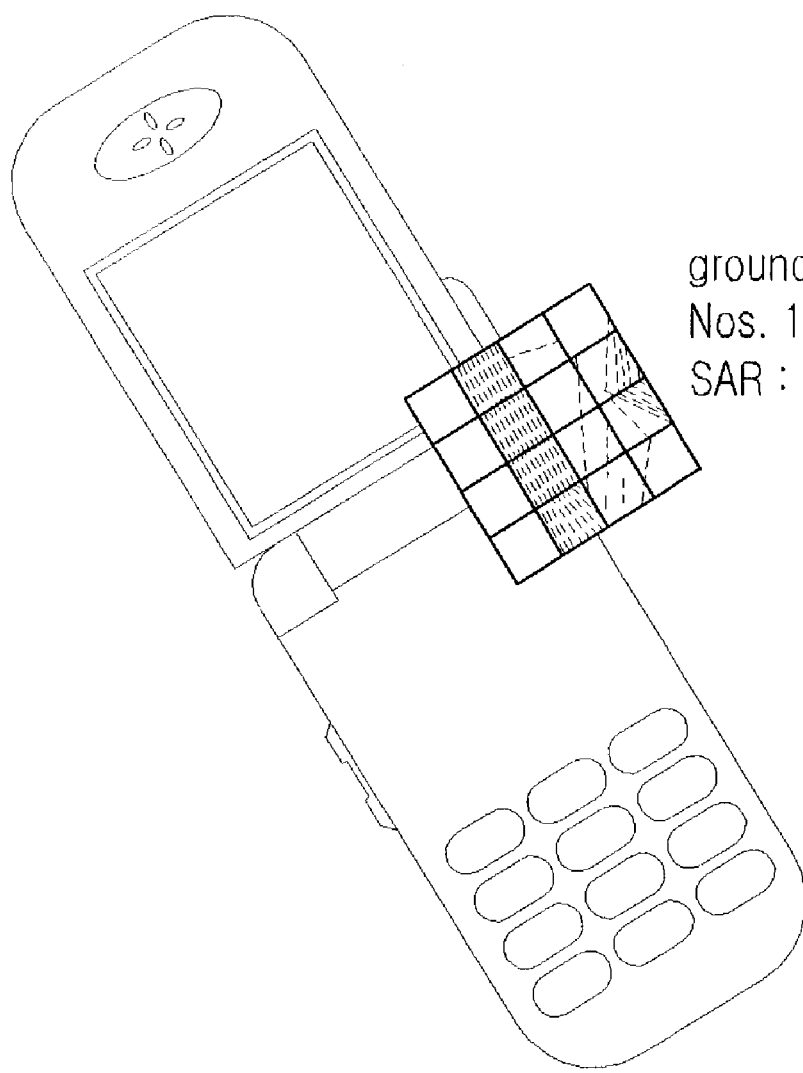

Further, if the ground contact of the ground plane is provided in the position No. 1 (in the same manner as the related art wireless phone), as shown in FIG. 7a, a hot spot on which strong electric field is concentrated is positioned within the main body of the wireless phone and the SAR value is 2.50 mW/g beside the restriction range (1.6 mW/g or below) of the electromagnetic wave. However, as shown in FIGS. 7b to 7d, if the ground contact is additionally provided in the position of the antenna feed point or near the antenna feed point, it is noted that the SAR value meets the restriction range of the electromagnetic wave in the wireless phone.

Figure 8:
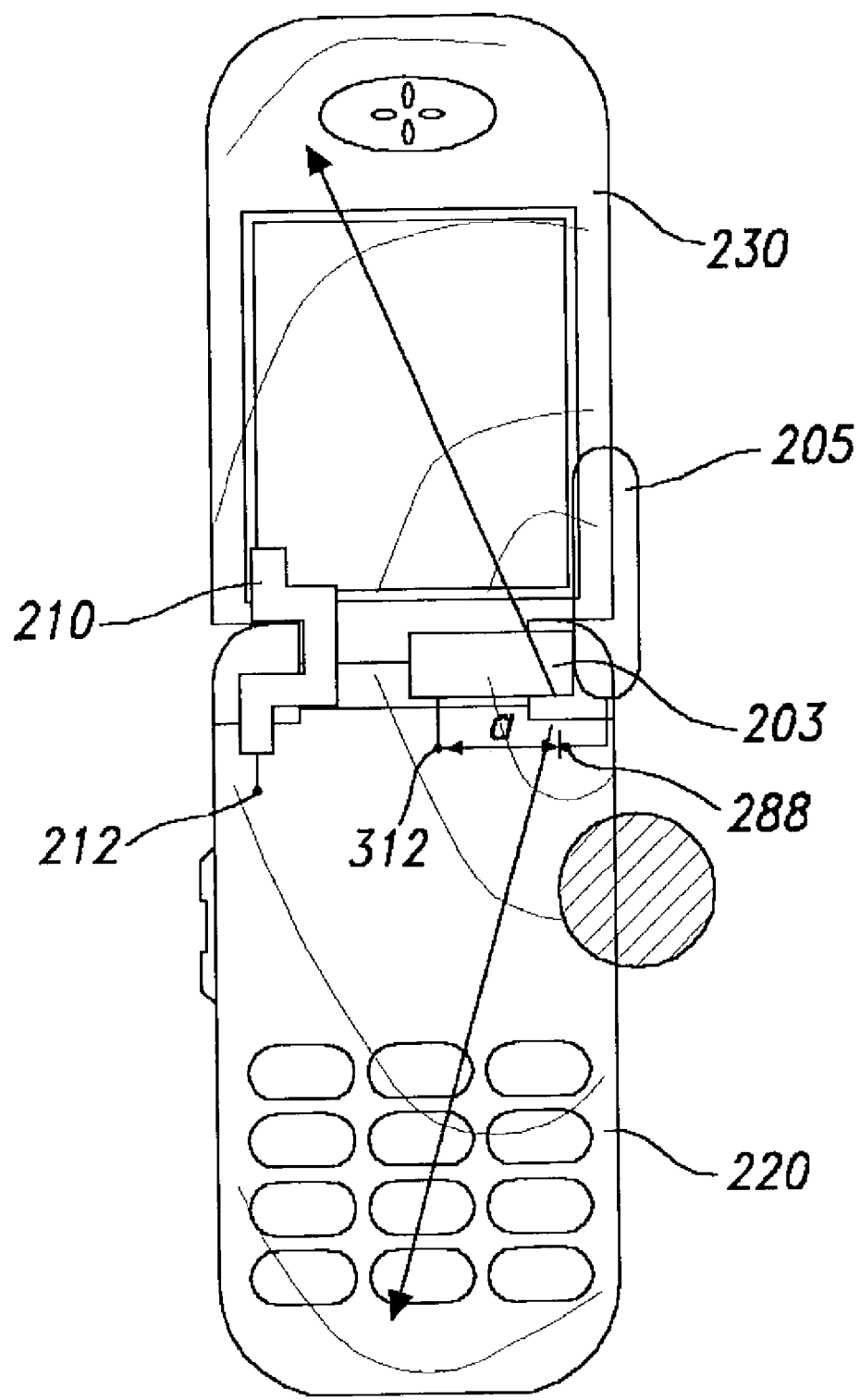
FIG. 8 illustrates the distribution of SAR in a folder type wireless phone according to the present invention.

The structure of the wireless phone having an improved SAR according to the present invention will be described in more detail with reference to FIG. 8.

The existing ground contact is provided using the related art FPCB, and the ground contact of the ground plane is additionally provided using the hinge formed in the antenna feed point. Particularly, the ground contact 312 provided using the hinge is positioned within the predetermined distance 'a' away from the antenna feed point 288. Thus, the hot spot (slant lines) is formed outside the wireless phone. The SAR value is affected greatly by the hot spot. The smallest SAR value is measured in the outermost hot spot as shown in FIG. 7d.

Therefore, it is possible to provide the wireless phone that can shield a user from the electromagnetic wave by reducing the SAR value without changing its structure or preparing a separate unit.

In the present invention, while the connection terminal of the ground plane has been additionally provided using the hinge, a separate conductor may be used.

As aforementioned, the wireless phone having an improved SAR according to the present invention has the following advantages.

When the circuit board of the wireless phone is grounded to the ground planes formed in the upper and lower plates, two or more ground contacts of the circuit board are provided. One of the ground contacts is positioned near the antenna feed point so that the SAR value of the wireless phone can be reduced.

Furthermore, since the ground contact is additionally provided using the hinge without changing the structure of the wireless phone, the wireless phone having an improved SAR can be obtained at low cost.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A wireless phone having an improved SAR comprising:
a lower plate having a first circuit board;
an upper plate having a second circuit board;
a hinge provided to open and close the lower plate and the upper plate;
an antenna feed point formed in the first circuit board; and
ground planes provided in the first circuit board and the second circuit board and connected to each other by at least two separate connection terminals, one of the at least two separate connection terminals being grounded with a first ground contact of the first circuit board and another of the at least two separate connection terminals being grounded with a second ground contact, wherein the second ground contact is located within the range of 2 cm away from the antenna feed point.

2. The wireless phone having an improved SAR according to claim 1, wherein the the one of the at least two separate connection terminals is arranged on a flexible PCB.

3. The wireless phone having an improved SAR according to claim 2, wherein the second ground contact formed within the range of 2 cm away from the antenna feed point is provided using the hinge.

4. The wireless phone having an improved SAR according to claim 3, wherein the other of the at least two separate connection terminals is provided using a central shaft formed in the hinge.

5. The wireless phone having an improved SAR according to claim 2, wherein the antenna feed point is formed outside the range of 2 cm away from the FPCB.

6. The wireless phone having an improved SAR according to claim 2, wherein the FPCB is provided to bypass the hinge.

7. The wireless phone having an improved SAR according to claim 1, wherein the second ground contact is provided in the first circuit board or the second circuit board.

8. A wireless phone having an improved SAR comprising:
a lower plate having a first circuit board;
an upper plate having a second circuit board;
a hinge provided to open and close the lower plate and the upper plate;

an antenna feed point arranged on the first circuit board;
ground planes provided in the first circuit board and the second circuit board and connected to each other by at least two separate connection members;
one of the at least two connection members comprising a first ground contact and another of the at least two connection members comprising a second ground contact;
the second ground contact being spaced from the antenna feed point between 0.5 cm and 1 cm or by a distance that is within 2 cm; and
the first ground contact being spaced from the second ground contact.

9. The wireless phone having an improved SAR according to claim 8, wherein the one of the at least two connection members comprises an FPCB.

10. The wireless phone having an improved SAR according to claim 8, wherein the other of the at least two connection members comprises one of the hinge and a portion of the hinge.

11. The wireless phone having an improved SAR according to claim 8, wherein the one of the at least two connection members comprises an FPCB and wherein the other of the at least two connection members comprises one of the hinge and a portion of the hinge.

12. The wireless phone having an improved SAR according to claim 8, wherein the one of the at least two connection members comprises an FPCB and wherein the other of the at least two connection members comprises one of the hinge and a portion of the hinge.

13. A wireless phone having an improved SAR comprising:
a lower plate having a first circuit board;
an upper plate having a second circuit board;
a hinge connecting together the lower plate and the upper plate;
a first ground plane for the first circuit board and a second ground plane for the second circuit board;
the first and second ground planes being connected to each other by separate first and second connection arrangements;
the first connection arrangement having a first ground contact arranged one of the first circuit board and the second circuit board;
the second ground contact being arranged on the first circuit board and being spaced by a distance from an antenna feed point,
wherein the distance results in an SAR hot spot being located outside of the wireless phone.

14. The wireless phone having an improved SAR according to claim 13, wherein the first connection arrangement comprises an FPCB and wherein the second connection arrangement comprises one of the hinge and a portion of the hinge.

15. The wireless phone having an improved SAR according to claim 13, wherein the distance is between 0.5 cm and 1 cm or within 2 cm.

16. The wireless phone having an improved SAR according to claim 13, wherein the first ground contact is arranged on the first circuit board.

17. The wireless phone having an improved SAR according to claim 13, wherein the antenna feed point is arranged on the first circuit board.

* * * * *